United States Patent
Yadkikar et al.

(10) Patent No.: US 12,406,589 B2
(45) Date of Patent: Sep. 2, 2025

(54) IMMERSIVE LEARNING EXPERIENCES IN APPLICATION PROCESS FLOWS

(71) Applicant: Accenture Global Solutions Limited, Dublin (IE)

(72) Inventors: Abhijit Avinash Yadkikar, Pune (IN); Romesh Viswanath, Hyderabad (IN); Ajit Thite, Pune (IN); Ashok Mishra, Mumbai (IN); Amit Tahilramani, Chantilly, VA (US); Ram Mohen Venkatakrishnan, Bengaluru (IN)

(73) Assignee: Accenture Global Solutions Limited, Dublin (IE)

( * ) Notice: Subject to any disclaimer, the term of this patent is extended or adjusted under 35 U.S.C. 154(b) by 183 days.

(21) Appl. No.: 18/172,443

(22) Filed: Feb. 22, 2023

(65) Prior Publication Data
US 2023/0274654 A1 Aug. 31, 2023

Related U.S. Application Data

(60) Provisional application No. 63/313,920, filed on Feb. 25, 2022.

(51) Int. Cl.
| | |
|---|---|
| *G09B 5/02* | (2006.01) |
| *G06T 11/00* | (2006.01) |
| *G06V 30/413* | (2022.01) |
| *G06V 30/416* | (2022.01) |
| *G09B 7/02* | (2006.01) |
| *G09B 19/00* | (2006.01) |

(52) U.S. Cl.
CPC ............... *G09B 5/02* (2013.01); *G06T 11/00* (2013.01); *G06V 30/413* (2022.01); *G06V 30/416* (2022.01); *G09B 7/02* (2013.01); *G09B 19/003* (2013.01)

(58) Field of Classification Search
CPC .......... G09B 5/02; G09B 7/02; G09B 19/003; G06V 30/413; G06V 30/416; G06T 11/00
See application file for complete search history.

(56) References Cited

U.S. PATENT DOCUMENTS

| | | | |
|---|---|---|---|
| 7,401,286 B1 * | 7/2008 | Hendricks | G06F 40/134 715/264 |
| 9,530,326 B1 | 12/2016 | Ramloll | |
| 2007/0055699 A1 * | 3/2007 | Kasai | G06F 16/58 |
| 2007/0250468 A1 * | 10/2007 | Pieper | G06F 16/9535 |
| 2008/0201632 A1 * | 8/2008 | Hong | G06F 16/38 707/E17.108 |
| 2012/0329026 A1 * | 12/2012 | Lewolt | G09B 7/00 434/322 |

(Continued)

*Primary Examiner* — Eddy Saint-Vil
(74) *Attorney, Agent, or Firm* — Seed Intellectual Property Law Group LLP

(57) ABSTRACT

Systems and methods for providing immersive learning solutions in the context of application process flows. In one example, legacy training documents can be submitted to the system and classified and sorted based on topic and granularity. The sorted information can then be assigned to one or more learning medium buckets that will define the type of learning course experience to be generated. For example, information about a first topic at the words and sentences levels can be used to generate an interactive question-and-answer avatar that can intelligently respond to users and assist during their use of the application.

17 Claims, 11 Drawing Sheets

(56) References Cited

U.S. PATENT DOCUMENTS

| | | | |
|---|---|---|---|
| 2014/0278378 A1* | 9/2014 | Mellett | G09B 7/02 |
| | | | 704/9 |
| 2015/0046800 A1* | 2/2015 | Isidore | G06F 40/166 |
| | | | 715/255 |
| 2015/0106378 A1* | 4/2015 | Clark | G06F 16/353 |
| | | | 707/740 |
| 2015/0254214 A1* | 9/2015 | Rosenberg | G09B 7/08 |
| | | | 715/202 |
| 2016/0225278 A1* | 8/2016 | Leddy | G09B 7/06 |
| 2019/0244127 A1 | 8/2019 | Amado et al. | |
| 2020/0142856 A1* | 5/2020 | Neelamana | G06V 30/40 |

* cited by examiner

IMMERSIVE LEARNING EXPERIENCES IN APPLICATION PROCESS FLOWS

PRIORITY CLAIM

This application claims priority to U.S. Provisional Patent Application Ser. No. 63/313,920, entitled "Immersive Learning Experiences", filed on Feb. 25, 2022, which is incorporated by reference in its entirety.

TECHNICAL FIELD

The present disclosure generally relates to immersive learning solutions for application process flows. More specifically, the present disclosure generally relates to a system and method for providing an interactive avatar to users during application runtime that provides intuitive guidance and access to relevant learning modules.

BACKGROUND

There is a heavy dependency on training and coaching of resources for organizations (e.g., data flow journeys in Internet Technology (IT) stacks). Every point along a resource journey through a software application typically requires some level of guidance. In some cases, the environment can be dependent on senior resources for guidance, or coaching from subject matter advisors. The need for relevant, easy to access, and simple to follow guidance has a great impact on the quality industry in terms of time, effort, quality, and cost. Even when there is a plethora of 'help' documents available, it can become a burden to the end-user to search through each document in the hopes of obtaining the information that is relevant to their current goals—whether it is to learn more details about a particular process or to better appreciate high-level concepts related to the process.

There is a need in the art for a system and method that addresses the shortcomings discussed above.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

SUMMARY

Figure 1:
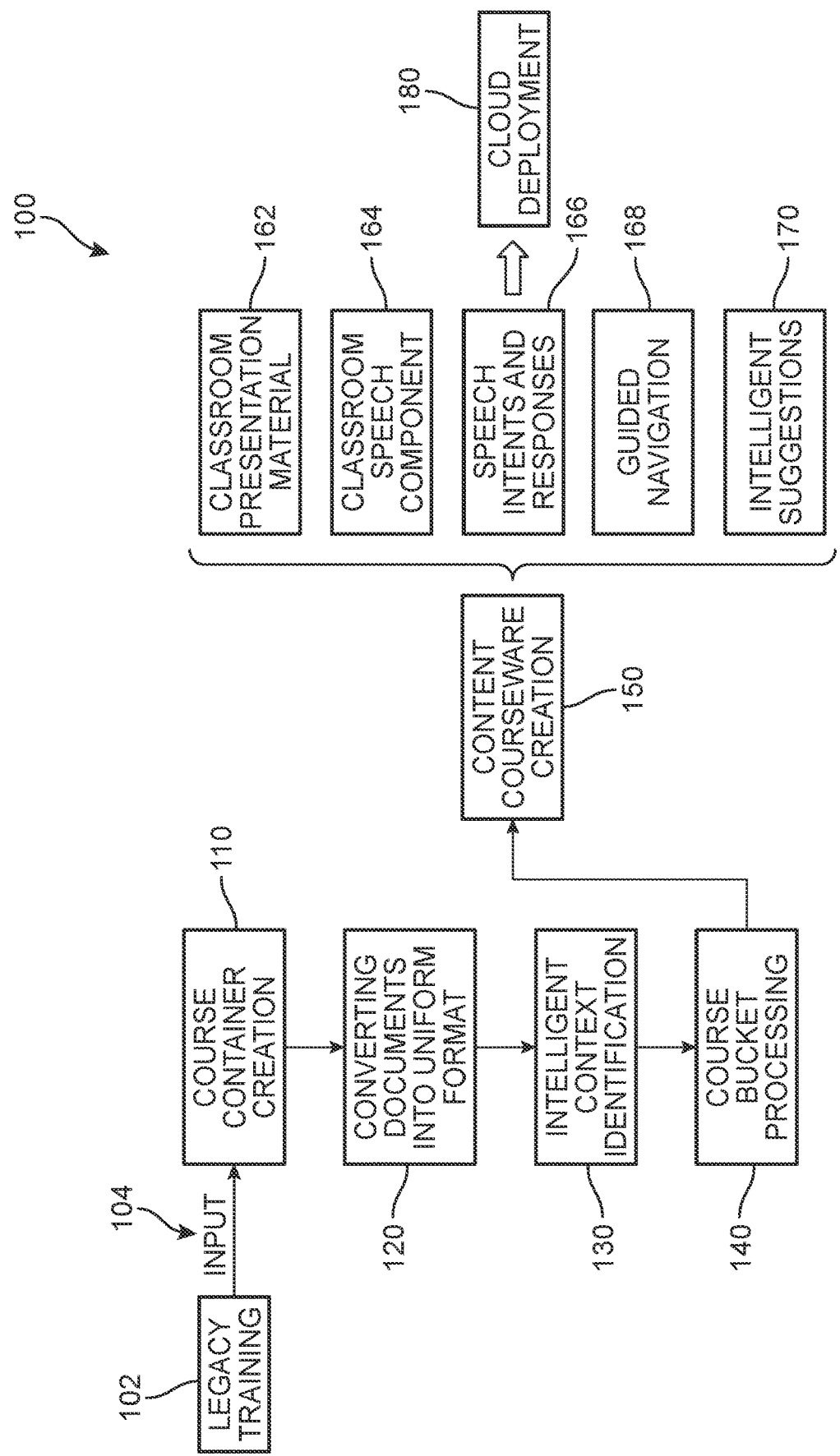
FIG. 1 is a schematic diagram of a high-level overview of an automated courseware generation system, according to an embodiment.

Implementations described herein provide for the generation and presentation of immersive learning solutions in the context of application process flows. The proposed embodiments describe course content development modules for managing the learning and training needs of an enterprise in an effective manner that is responsive to dynamic business needs. Although it may sometimes be convenient to buy precompiled learning content from a third party as opposed to developing or compiling new content, oftentimes, the specialized needs of the organization may make it difficult to utilize outsourced or precompiled learning or training content. According to the present embodiments, content can be automatically developed that is specific to the applications of a given enterprise. As legacy documents are inputted into the system, the information contained therein can be harvested and adapted to assemble and compile custom learning content materials for use in the learning solution. Thus, what would otherwise be static information or information to be passively consumed by a user can be converted into interactive and immersive training courseware that facilitates a richer learning experience. This courseware can be readily integrated and implemented as part of an overall learning solution for the software.

Furthermore, the embodiments seek to capture the benefits associated with traditional learning delivery methods such as team-oriented learning and personal instructor feedback by generation of interactive avatars that can engage with users in a virtual classroom setting. Typical online educational or learning systems provide a single environment (e.g., a virtual environment) which all learners must utilize. However, different learners may require different learning mediums. The system can provide a multi-modality approach that promotes a learning environment that more quickly advances and cultivates the skills of its user base.

In one example, legacy training documents can be submitted to the system and classified and sorted based on topic and granularity. The sorted information can then be assigned to one or more learning-medium buckets that will define the type of learning course experience to be generated. For example, information about a first topic at the words and sentences levels can be used to generate an interactive question-and-answer avatar that can intelligently respond to users and assist during their use of the application. In some examples, legacy documents may provide details characterizing the purpose of a specific task, the steps involved in performing the task, and/or the types of inputs and/or information needed to successfully complete the task. The system and method enable the automated processing of the legacy documents and extraction of relevant details. The extracted electronic content can be stored in a common format. Furthermore, the system and method can include creation of learning modules, for example based on the converted data and pre-seeded process maps and pre-built keyword maps. In addition, the system and method can include the automated generation and presentation of the courseware.

In one aspect, the disclosure provides a computer-implemented method of automatically generating an interactive avatar for training human end-users. The method includes a first step of receiving a first document including first data, and a second step of filtering and sorting the first data based on four levels of granularity, including words, sentences, images, and pages, thereby producing granularized data including word data, sentence data, image data, and pages data. The method also includes a third step of assigning, via a learning module creation engine, content in the granularized data that includes only the word data and sentence data to a first learning medium category, and a fourth step of automatically generating, via the learning module creation engine, a first course module based on the content assigned to the first learning medium category. A fifth step includes generating, via a courseware creation engine, a first interactive avatar user training experience based on the first course module, and a sixth step includes presenting, at a computing device, the first interactive avatar user training experience.

In another aspect, the disclosure provides a non-transitory computer-readable medium storing software comprising instructions executable by one or more computers which, upon such execution, cause the one or more computers to: (1) receive a first document including first data; (2) filter and sorting the first data based on four levels of granularity, including words, sentences, images, and pages, thereby producing granularized data including word data, sentence data, image data, and pages data; (3) assign, via a learning module creation engine, content in the granularized data that includes only the word data and sentence data to a first learning medium category; (4) automatically generate, via the learning module creation engine, a first course module based on the content assigned to the first learning medium category; (5) generate, via a courseware creation engine, a first interactive avatar user training experience based on the first course module; and (6) present, at a computing device, the first interactive avatar user training experience.

In another aspect, the disclosure provides a system for automatically generating an interactive avatar for training human end-users. The system comprises one or more computers and one or more storage devices storing instructions that are operable, when executed by the one or more computers, to cause the one or more computers to: (1) receive a first document including first data; (2) filter and sorting the first data based on four levels of granularity, including words, sentences, images, and pages, thereby producing granularized data including word data, sentence data, image data, and pages data; (3) assign, via a learning module creation engine, content in the granularized data that includes only the word data and sentence data to a first learning medium category; (4) automatically generate, via the learning module creation engine, a first course module based on the content assigned to the first learning medium category; (5) generate, via a courseware creation engine, a first interactive avatar user training experience based on the first course module; and (6) present, at a computing device, the first interactive avatar user training experience.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

DESCRIPTION OF EMBODIMENTS

Ensuring users have the necessary information to make use of an application process flow platform or other software system is key to end-user acquisition and satisfaction. Businesses face challenges in conveying knowledge to every user joining an organization or other project. Some users, particularly those new to the platform or a particular feature of the program (application or "app"), may have trouble interacting with the interface as they face multiple options and features. For example, a user may wish to perform a particular task via the platform. As they begin the task, the user will attempt to intuit a process for completing their desired task. However, it may require several interaction events with the user interface in order for a user to be able to skillfully complete the task, and during that time mistakes may be made that can cause errors and/or lead to harm for the enterprise. In addition, a user who has not performed the same task for an extended period of time may be out of practice and require assistance or additional time to complete the task, which can decrease efficiency. Furthermore, user trainings have traditionally consisted of user reliance on static, document-based information exchanges.

The proposed systems and methods describe an intelligent, dynamic, interactive virtual guide for assisting users of a software system. The guide is configured to harvest and process legacy training documents associated with the software and automatically generate one or more learning modules that will serve to teach users relevant knowledge regarding their selected task. In some embodiments, the learning module can offer a high-level overview of the goals and nature of the task, while in other embodiments, the learning module can present more discrete, low-level guidance that 'walks' the user through each step of their task. Rather than rely on passive, limited interactions with static documents, the information can be offered via a user-friendly virtual avatar assistant that can interact with the user in real-time regarding various topics, as well as provide options for immersion in virtual classrooms, step-by-step guided navigation, and question-and-answer audio and/or chat communication.

Through dialog-based simulated conversations, a virtual assistant can provide a range of automated assistance to a user, where the virtual assistant solicits one or more inputs from the user (e.g., in the form of a question) and process the user responses to provide additional solicitations, and/or take a particular action (e.g., provide recommended content). As will be discussed in detail below, the proposed paradigm relies on intelligent machine learning algorithms to capture relevant information across a wide variety of documents, extract the information as specific granular objects, and assign the information to a matrix of 'buckets' or learning module component types/categories, a technique that will be referred to herein as intelligent learning content (ILC) creation. The proposed embodiments can thereby offer an intelligent approach to enhance the user's understanding of the information beyond static documentation by way of an augmented reality (AR)-based virtual assistant avatar that encourages higher user engagement, improved knowledge comprehension, and more ready adoption of the software.

As described herein, the proposed embodiments offer a novel technique for building a corpus of learning modules from legacy data. Legacy data can be understood to refer to data and documents that were created or otherwise stored before the present computing system was implemented. Companies and organizations that own data and documents in electronic form frequently face a problem of migrating legacy documents, often in proprietary formats, into new document formats that allow performance of such operations in a most cost effective and efficient manner. Companies must often perform conversions of the legacy documents into the new document model. The conversion process not only transforms legacy documents from an existing format into a new one, such as, for example, from Microsoft Word™ into extended mark-up language, but also customizes information which is not explicitly encoded in the legacy documents using the document's metadata. Legacy documents also refer to non-digitized information associated with the organization.

As a general matter, individuals, schools, small and large companies all produce a tremendous amount of documentation whether for personal view or public dissemination. Companies may have product manuals that accompany its products or employee handbooks for its employees. Schools may have course catalogs directed to students or graduate-level theses for publication to the public at large. Historically, these documents were maintained in a hard copy format stored in one or a number of locations for people to review when needed. However, with the growth of local and wide area networking, many companies recognized the value of converting paper documents into electronic documents. Electronic document systems were developed that managed large numbers of electronic documents that were converted from the hard copies. A variety of mechanisms and techniques can be used to convert and/or import the available legacy documentation into a more modern format for consumption by current electronic document systems. In the present application, legacy documents refer more specifically to training documents associated with an organization, including word/text-based documents, audio files, video files, mixed media files, image files, presentations, spreadsheets, flow charts, graphs, etc. These legacy documents are repositories or compendiums of information that can explain, educate, inform, guide, teach, clarify, or otherwise offer some source of knowledge with respect to the organization. They can include case studies, activity handouts, copies of slides, information summaries, course notes, group discussions, transcripts, videos of teachers, records of role playing, worksheets, tutorials, outlines, logistical descriptions, glossaries, and other training materials, etc.

As a general overview, the proposed process involves the creation of a basic (generalized) 'course container' and associated sub-containers or buckets (see below). For example, referring to the schematic diagram of FIG. 1, a system can, in an initial stage 104, ingest or receive available legacy training documents 102 (or documents 102 or legacy documents 102) (e.g., Powerpoint® and other slideshows, PDFs, Word® and other text-based documents or files, Excel® and other spreadsheets, image data, videos, etc.). These documents 102 can be harvested and then read and interpreted by the system, for example using optical recognition technology. Following the processing of this input, in a first stage 110, the system can create a basic course container in which the data from the documents 102 are initially stored. In a second stage 120, the information may be converted into a common (uniform) format or internal messaging format.

In some embodiments, in a third stage 130, the converted data can be inputted to an algorithm for intelligent context identification. In different embodiments, the algorithm can be used to facilitate platform operations, business and application processes, and navigation flows. The algorithm can then automatically process the collected data into course foundation blocks or 'buckets' in a fourth stage 140. In other words, the algorithm can generate suggestions about what content should be added to which buckets, and ensure a preset threshold of information has been met before allowing a user to access the courseware. In some embodiments, a first threshold may be met for one type of learning medium (e.g., virtual classroom) based on a set of training documents, while the same set of training documents may be insufficient to meet a second threshold for a different learning medium (e.g., guided navigation). In turn, at a fifth stage 150, these buckets will be used to generate content courseware for various features and processes associated with the software. In different embodiments, the course foundation blocks and generated courseware can be stored on the cloud for universal access. For purposes of this application, "content" refers to the information stored in a document, whether digital (e.g., stored as digital media) or analog (e.g., printed on paper). As used herein, the terms "electronic document" (or simply, "document") mean a set of electronic data, including both electronic data stored in a file and electronic data received over a network. A document can include multiple electronic contents and multiple types of electronic content. An electronic document does not necessarily, but may, correspond to a file. A document may be stored in a portion of a file that holds other documents, in a single file dedicated to the document in question, or in a set of coordinated files. The term "object" may refer to information sources such as documents, reports, presentations, files and directories. The "document" can also refer to a digitized document (scanned copies of paper documents).

As introduced in FIG. 1, in different embodiments, system-generated virtual learning experience courseware 160 (or courseware 160) can include one or more learning medium categories such as (a) classroom presentation materials 162, (b) classroom presentation speech components 164, (c) speech intents and responses (i.e., Q & A) 166, (d) guided navigation 168, including both (1) objects and (2)

speech. These can be used to produce intelligent suggestions or recommendations 170. The format in which the information is converted in each of these five categories can be combined to produce mixed-experiences for the user (e.g., audio+presentation, audio+chatbot, audio+walkthrough+ Q&A, etc.). Finally, in some embodiments, the courseware 160 can be deployed to the cloud or other platform in a sixth stage 180.

Thus, the proposed systems provide a highly interactive training avatar that is configured to actively guide consumers of the application(s) or knowledge base by automatic extraction and organization of data in the legacy training documents. Speech intents and responses can be harvested to automatically generate a set of questions and answers that facilitate a rich back-and-forth interaction with a user. For example, by classifying some of the training data as speech components, information in the documents can be converted to audio (speech) so that the avatar can maintain a natural language spoken dialogue with the user. A user can thus submit questions and receive responses in a written (typed) exchange or a verbal conversation. Similarly, guided navigation can be provided by the avatar, with a step-by-step (or screen-by-screen) walkthrough that provides details for each of the fields offered by the application that can also include audio via the speech component. In another example, the avatar can take on a virtual teacher role, presenting documents or other materials while instructing the user more directly and supplementing what is presented in the classroom with enriched knowledge that was created by combining multiple training documents. In other words, the information in one bucket can be intelligently interwoven with related information in another bucket to produce a richer learning outcome for the user. For example, one document may describe a topic at a very high level, while another document may discuss the same topic at a much more detailed (low) level. The system can automatically bring these two sources of information together, correlating keywords and overlapping subjects, to produce a coherent, unified courseware module. In some embodiments, the avatar 'sits' or resides in the application, as an embedded assistant that can be selected by the user whenever desired for guidance or clarification.

Figure 2:
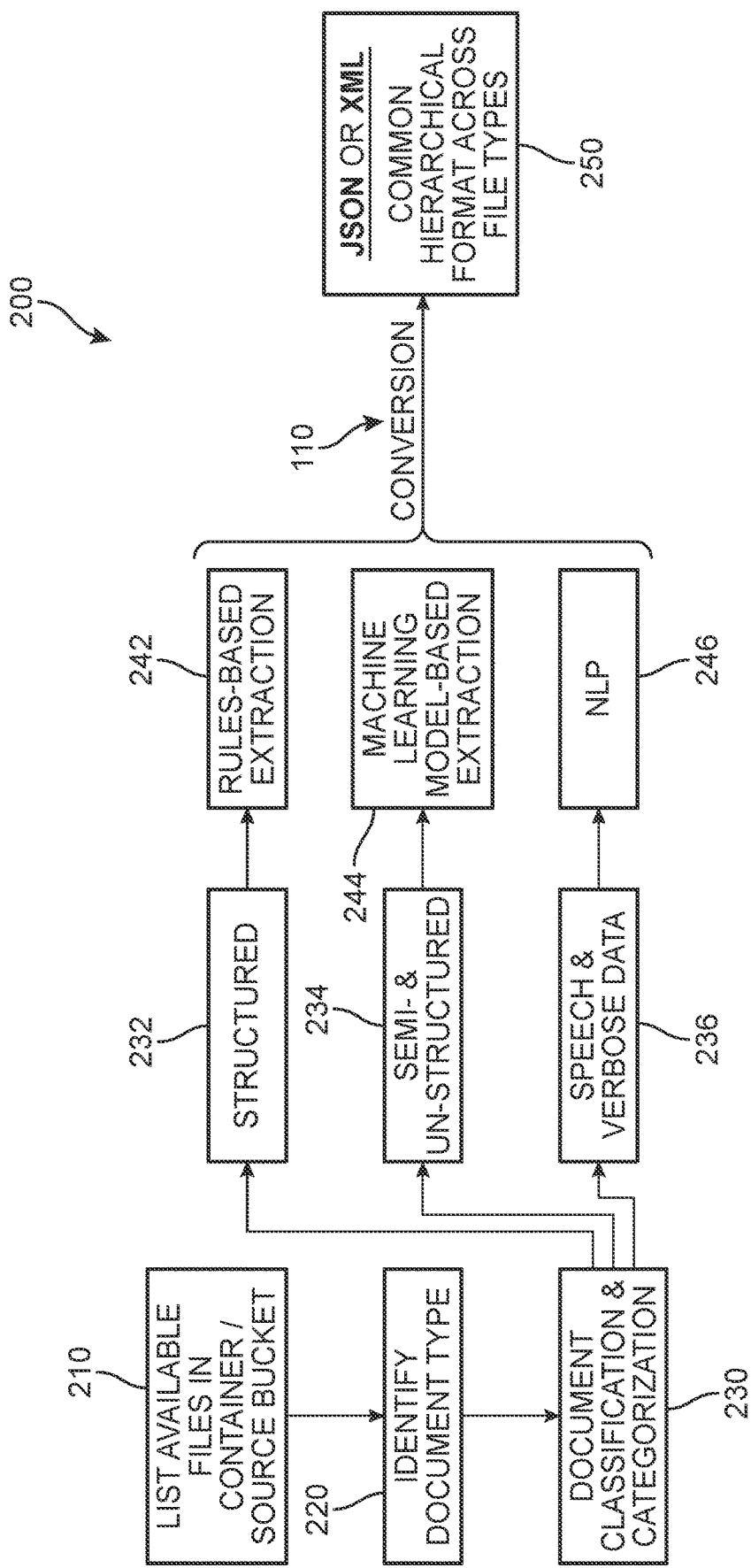
FIG. 2 is a flow diagram of a process by which content processing and extraction is performed, according to an embodiment.
Figure 3:
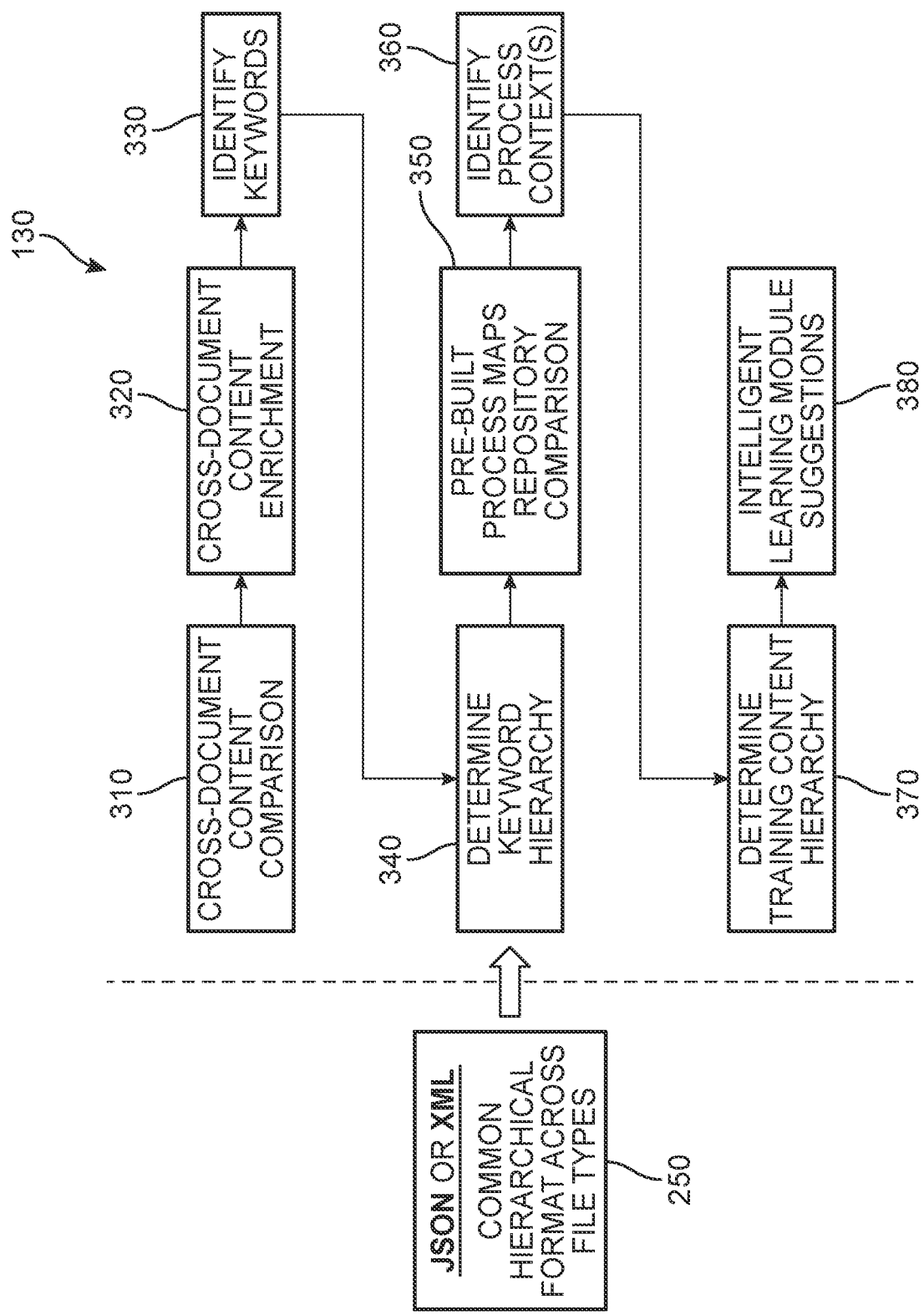
FIG. 3 is a flow diagram of a process by which learning module creation is performed, according to an embodiment.
Figure 4:
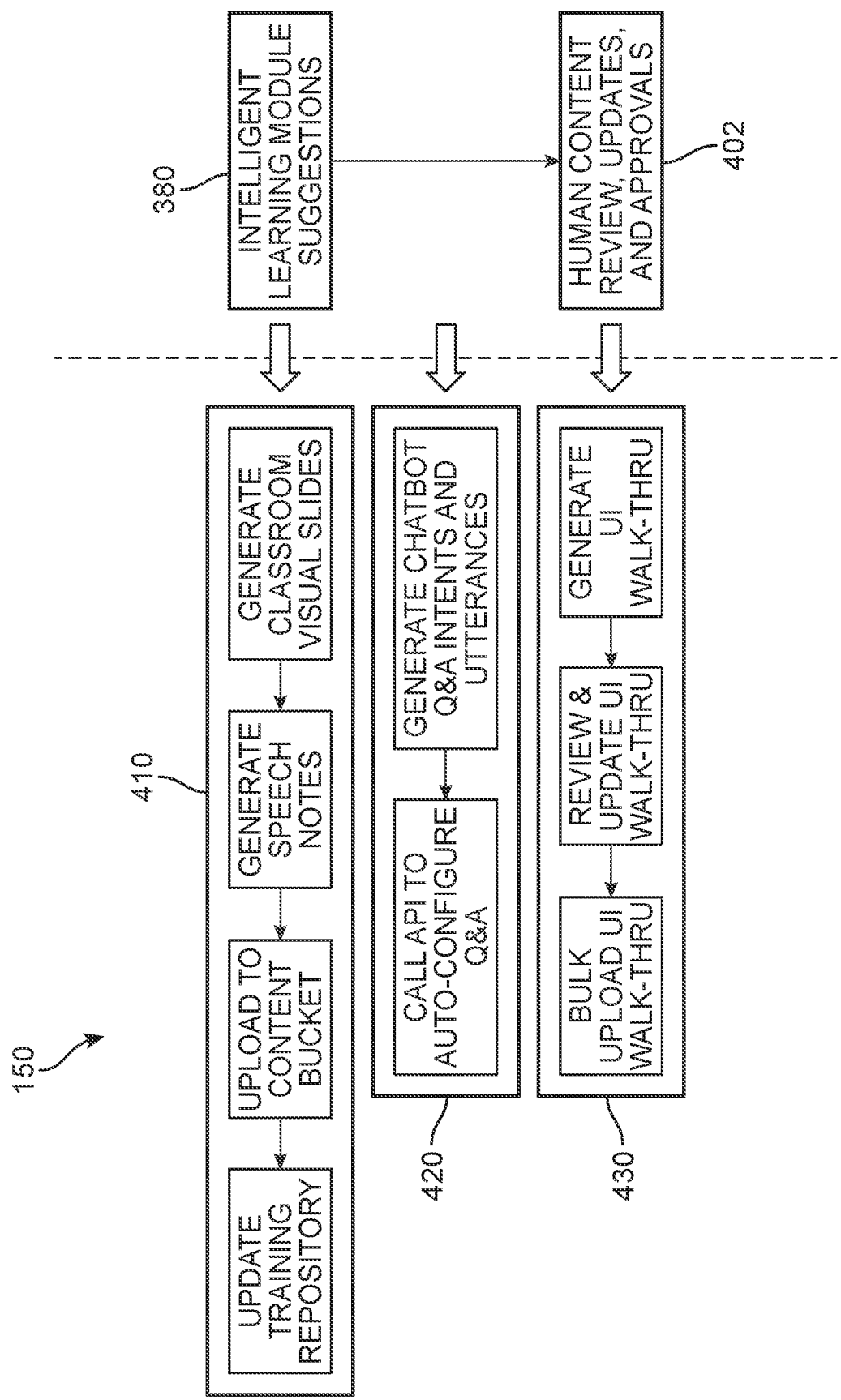
FIG. 4 is a flow diagram of a process by which courseware is created, according to an embodiment.

FIGS. 2, 3, and 4 present additional details about this process. As noted in FIG. 1, in some embodiments, initial stage 104 can involve receiving of legacy documents 102. This is followed by the first stage 110, which involves processing and extraction of content based on the legacy documents 102. For example, if the documents include an infographic, such a document can be parsed and specific data types can be identified, such as structured data, semi and unstructured data, speech, verbose data, keywords, etc. In some embodiments, irrelevant content can be identified and removed, and/or text can be extracted from images. In one example, rules-based extraction, machine learning module-based extraction, and/or natural language processing techniques will be used. The output will be stored in a common hierarchical format across the file types (e.g., JSON).

As a general matter, a granularity or abstraction level indication can serve to define the scope of a concept relative to meaningful levels of abstraction within the underlying grammar/syntax. For example, in a legacy training document, abstraction levels can be identified in data at the letter (character), word, sentence, paragraph, image, table, graph, page, or full document to specify the granularity of the disclosed concepts. In some embodiments, the granularity, or abstraction indication, is used by the parser to understand how to parse the electronic content.

In some embodiments, the extracted content can be assigned to one of four content types based on their level of granularity: (1) words (granularity L1), (2) sentences (granularity L2), (3) images (granularity L3), and (4) pages (granularity L4). For purposes of this application, a word is a single alphanumeric term, typically corresponding to a single distinct meaningful element of speech or writing. In addition, a sentence includes at least two words, an image includes a graphical element, and a page is the content in its entirety in the case of single-page document, or a discrete segment of a document in the case of multi-page documents.

More specifically, in a first step 210 of first stage 110, a content processing and extraction engine of the proposed systems can list available files in the container (source) created, for example as a directory or other file inventory. In a second step 220, for each document of the legacy documents, the document type can be identified by the content processing and extraction engine (e.g., Powerpoint®, PDF®, Word®, image, or other file type). In some embodiments, metadata for the file and/or the file extension can be used by the content processing and extraction engine to determine the document type.

In a third step 230, the documents are classified and categorized by the content processing and extraction engine. As noted above, such classification can be based on whether the document includes (a) structured data 232, (b) semi- and/or un-structured data 234, and (c) speech and/or verbose data. A structured document can have embedded code which enables arranging the information in a specified format. Unstructured documents include free form arrangements. A document processed by the system may include a structured electronic content, unstructured electronic content and/or a mixed set of electronic content with unstructured and structured data combined into a single electronic document. For example, documents may include one or more of structured and unstructured content of different formats some of which may include typed textual data while others may include handwritten text, some of the data may be presented as tables, graphs, or other non-textual formats. Thus, a single computer file may include unstructured documents, structured documents, or a combination of unstructured and structured documents, where the structured documents may have a defined data model. The file may include electronic content obtained from multiple sources and/or may have different formats. The different formats may include, but are not limited to editable documents and non-editable formats.

In different embodiments, as part of second stage 120, these categorized documents can then be translated or converted into the common language format. For example, in cases where a document is classified as including structured data 232, a rules-based extraction process 242 can be performed to output a version the document in a common hierarchical format 250. In cases where a document includes semi- and/or un-structured data 234, a machine learning model-based extraction process 244 may be performed to produce a version of the document in the common hierarchical format 250. In addition, in cases where a document is classified as including speech and/or verbose data 236, a natural language processing technique can be applied to produce a version of the document in the common hierarchical format 250.

Following the second stage 120, now moving to FIG. 3, in different embodiments, third stage 130 can involve the implementation of a learning module creation engine. In some embodiments, software specific categories may also be assigned based on pre-seeded or pre-built process maps and keyword maps that were provided to the algorithm for reference in making classification decisions. More specifically, in a first step 310 of the second stage 120, the content can be compared as it appears across different documents (cross-document content comparison) by a learning module creation engine. Furthermore, in a second step 320, the information can be enriched by this 'cross-document' process. In a third step 330, keywords may be identified, while in a fourth step 340 a keyword hierarchy (based on the pre-seeded keyword map) can be determined. A pre-built process maps can be used by the learning module creation engine to compare the data in fifth step 350, and used to identify process context(s) in a sixth step 360. In addition, at a seventh step 370, a training content hierarchy can be determined. This hierarchy may then be passed to an intelligent learning module to generate courseware suggestions 380, as part of fourth stage 140 (course bucket processing).

Referring now to FIG. 4, in different embodiments, the courseware suggestions 380 can serve as foundation blocks to create content courseware in fifth stage 150. In some embodiments, the algorithm will automatically generate courseware based on the intelligent learning module suggestions. For example, the system can automatically produce classroom visual slides, speech notes, chatbot Q&As (intents and utterances), user interface walkthroughs, etc. The courseware will be uploaded to a training repository and can be accessed by users during their interaction with the software. The courseware can be requested via an AI-based interactive avatar, transforming the passive, static knowledge offered in the legacy documents to active, dynamic tutorials and guidance. Using this approach, in some embodiments, the process of converting legacy documents to courseware can be configured to occur in response to a single 'click' or process.

As noted earlier, in different embodiments, the classified knowledge harvested from the legacy documents will then be assigned to one or more data containers or buckets comprising: (1) presentation containers, (2) presentation speech containers, (3) guided navigation containers, (4) guided navigation speech containers, and (5) intents and responses container (Q&A). For each document that is processed by the system, these five components can remain constant. Each of these "buckets" (a term used interchangeably with the term container) can then be used by the system to build user-friendly, intelligent courseware content. In different embodiments, human content review, updates, revisions, and approvals of the system generated courseware can also occur in a fine-tuning stage to produce human reviewed content 402.

FIG. 4 shows only some examples of this process. In a first example 410, the courseware suggestions 380 and/or human reviewed content 402 direct the system to generate classroom visual slides and also generate speech notes. This automatically generated audio-visual content can be uploaded to a first content container, which will further update the training repository for the application's courseware. In a second example 420, the courseware suggestions 380 and/or human reviewed content 402 can be used to generate question-and-answer (Q&A) content, and other intelligent intents and utterances, for supplying interactive chatbot conversation(s) with a user. A first API can then be automatically called by the system to configure the Q&A experience in the context of the given application. In a third example 430, a user interface (UI) walkthrough (e.g., "hand-holding") or guided navigation can be generated based on the courseware suggestions 380 and/or human reviewed content 402, which will be automatically reviewed and/or updated as more information is added, and uploaded to run with the application.

Figure 5:
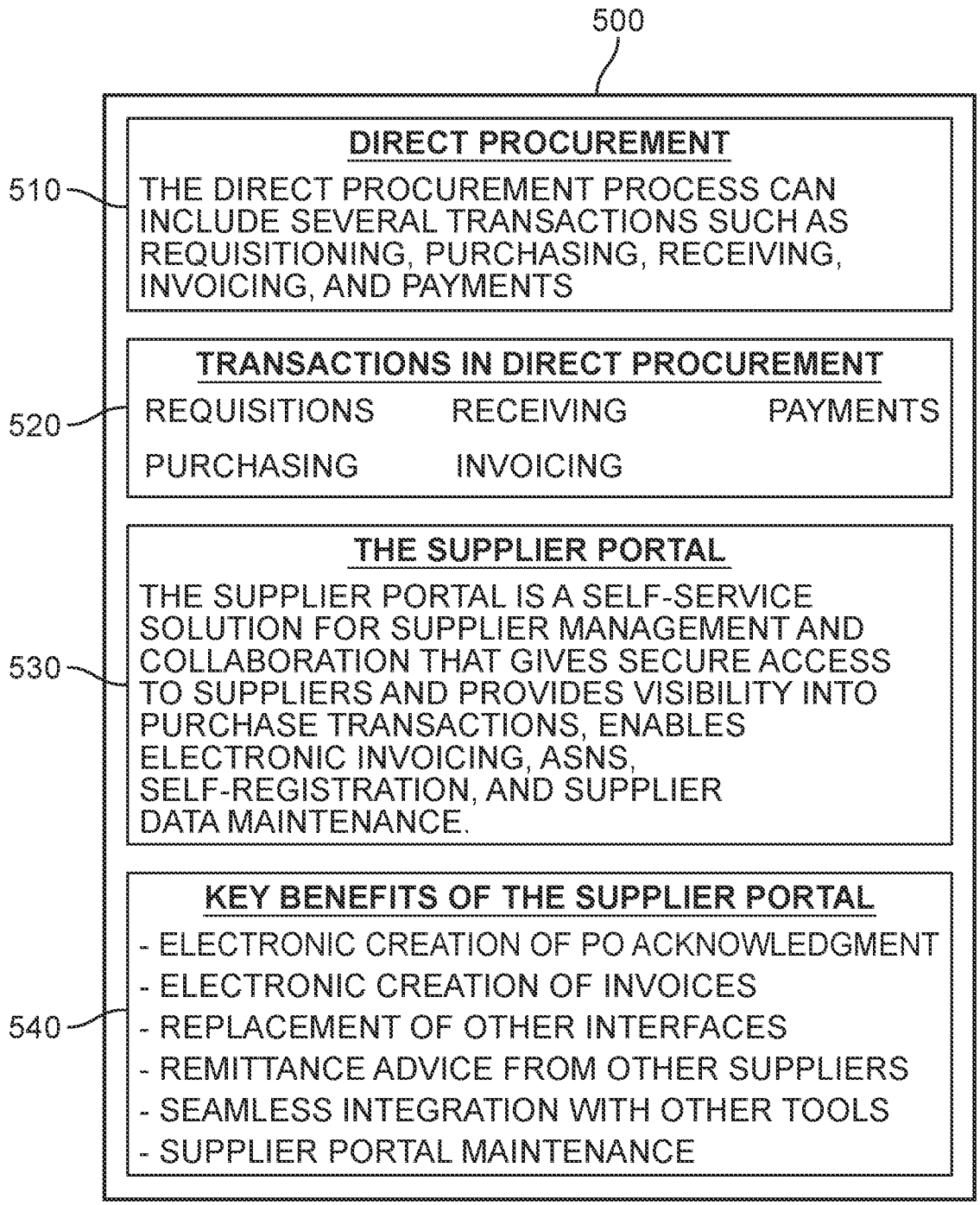
FIG. 5 is an example of a training document and system-identified content associations, according to an embodiment.
Figure 6:
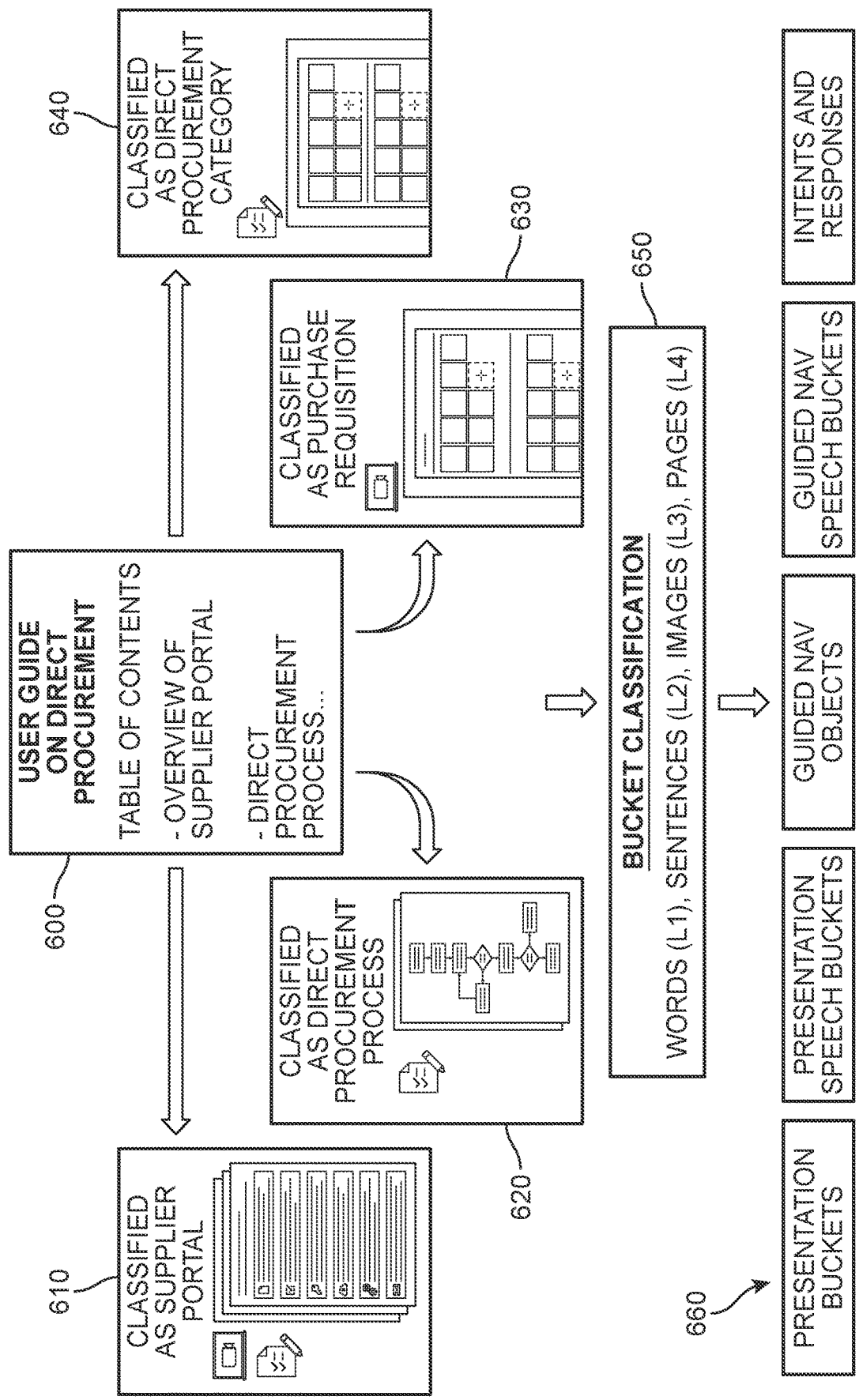
FIG. 6 is an example of an extraction of content portions from a training document and subsequent classifications, according to an embodiment.

For purposes of illustration, FIGS. 5 and 6 depict two examples of the document harvesting and bucket classification process described herein. Simply as an example, in FIG. 5, a first document 500 is represented that comprises a high-level "infographic" related to the topic of direct procurement. In other embodiments, the documents can include a wide range of information, per the subject matter covered by the legacy training corpus. In different embodiments, the system can receive this first document 500 as part of the legacy training documents. The content processing and extraction engine can isolate and extract specific portions of the document based on the type of data that is determined to be present in the document. Thus, it can be appreciated that a single document may include multiple types of data that can each be classified into a distinct and separate bucket.

In FIG. 5, a first section 510, second section 520, third section 530, and fourth section 540 have been identified. In this case, the system determines that the second section 520 and fourth section 540 includes structured data, and the first section 510 and the third section 530 includes natural language text. In addition, for purposes of this example, a diagram in first document 500 (not depicted in FIG. 5) is also extracted and labeled as un-structured data. In some embodiments, at this junction, the system can assess the content and automatically remove what is determined to be irrelevant content. In addition, text content that is found in visual elements (e.g., diagrams, charts, images, etc., not shown here) can also be extracted. Furthermore, the content processing and extraction engine can also identify keywords in the first document 500 (e.g., "Direct Procurement", "Transactions in Direct Procurement", "Requisitions", "Purchasing", "Payments", "Receiving (ASNs, PO Receipts)", "Invoicing", "Key Benefits of the Supplier Portal", etc.). In different embodiments, the words and other content in each of these sections can then be classified by the content processing and extraction engine into one of four buckets that are arranged in terms of the granularity of the information: Words (Granularity=Level 1 (L1)), Sentences (Granularity=Level 2 (L2)), Images (Granularity=Level 3 (L3)), and Pages (Granularity=Level 4 (L4)). This information, now classified into one or more of four buckets, is ready for ingestion and processing by the learning module creation engine.

In different embodiments, the proposed system will execute the following training and classification process involving a first parse and a second parse. The 'First Parse' involves a bucket matrix creation, whereby all of the training material provided for conversion can be parsed using keyword analysis. Buckets can be created associated with the legacy training material that is in scope. Initially only the structure may be created (first/header column and first/header row in the example below). All the remaining rows and columns are blank. As the content in the document is broken down into finer granularity levels, it can be assigned a category, as shown in Table 1 below.

TABLE 1

| Bucket Categories | Supplier Portal (A1) | Direct Procurement (A2) | Purchase Requisition (A3) | Direct Procurement Category (A4) |
|---|---|---|---|---|
| CRoom Presentation (C1) | Bucket 1 (A1C1) | Bucket 2 (A2C1) | Bucket 3 (A3C1) | Bucket 4 (A4C1) |
| Class-Room Speech (C2) | Bucket 5 (A1C2) | Bucket 6 (A2C2) | Bucket 7 (A3C2) | Bucket 8 (A4C2) |
| Guided Nav Speech (C3) | Bucket 9 (A1C3) | Bucket 10 (A2C3) | Bucket 11 (A3C3) | Bucket 12 (A4C3) |
| G-Nav Object Identifier (C4) | Bucket 13 (A1C4) | Bucket 14 (A2C4) | Bucket 15 (A3C4) | Bucket 16 (A4C4) |
| Intents and Responses (C5) | Bucket 17 (A1C5) | Bucket 18 (A2C5) | Bucket 19 (A3C5) | Bucket 20 (A4C5) |

The 'Second Parse' involves document extraction and bucket classification. It can be appreciated that with each parse, the information is further broken down. Objects in each category can be extracted and assigned to individual buckets based on a rules-engine algorithm described below. The extraction of the objects can occur under different granularities—e.g., Words (Granularity L1), Sentences (Granularity L2), Images (Granularity L3) and Pages (Granularity L4).

As one example, the Rules Algorithm can be configured to work based on five categories (A)-(E), described below. Category (A) Presentation Buckets (A1C1 to A4C1): only Granularity L3 and L4 will be filtered out for this bucket. The Association can be done to each bucket based on the context (e.g., in the parsing if a page belongs to "Supplier Portal" it goes in that bucket (A1C1). This may be classified using keywords parsing and match techniques. Further filtering out of the slides can be done based on presentability filter (e.g., page with more than 50 words discarded as not-presentable). Each stored object (L3 and L4) may be further classified into a sub-bucket to cater to individual slides in the presentation. Each sub-bucket can have a unique identifier assigned. Filtering and sorting can be performed using natural language processing techniques.

Category (B) Presentation Speech Buckets (A1C2 to A4C2): only Granularity L2 is to be considered for this bucket. Using intra and multi-sentence parsing the sentence can be associated with individual unique defined from the presentation bucket (e.g., this will associate the sentence to be spoken with the presentation slide being presented.) Based on the length of the sentence, the position of the sentence in the speech and the slide the sentence can be associated with the gestures of the avatar, and vocabulary, speech emotions (pause, modulation, etc.) can be introduced and the speech enriched.

Category (C) Guided Nav (navigation) Objects (A1C3 to A4C3)—only Granularity L1 will be used to identify Potential list of Guided Nav objects for this bucket. This can be done using an existing library of screen objects and associating keywords from L1 matching with the screen object library. The screen objects would be tagged as valid navigation objects based on the extent of match of those objects with the L1 list. Each Nav object can have a unique identified assigned.

Category (D) Guided Nav Speech Buckets (A1C4 to A4C4)—only Granularity L2 is considered for this bucket. A second level of filtering is used to identify only those Nav objects that are custom and not associated with the screen object library. A similar logic as the presentation speech bucket can be followed to identify the speech L2s. Each L2 sentence associated with a Nav object can be scored based on relevance and a highest-scoring sentences are associated as the final speech for that Nav object. As earlier, the IDs are used for co-relation.

Category (E) Intents and Responses (A1C5 to A4C5)—L1 and L2s are considered for this. Using Intra-sentence parsing and enrichment every L2 parse can be converted to a starting point intent with a unique identifier (e.g., "The supplier portal" will be converted to an intent like "What is a supplier portal?"). This can be done for every L2. The next step will be to eliminate all the L2s that have the same intent. The response associated to the intent can be created as a sub-bucket with the same identifier under the intent and will be initially blank. A second parse of L2s can be made to fill in the sub-buckets with the right responses—again using inter-sentence parsing and association.

As noted earlier, in different embodiments, the entire bucket list can then be converted into XML/JSON and stored in a conversion database. In another step, an association parsing algorithm can then create new courses based on individual functional bucket categories (A1, A2, A3, A4 in this case) with additional steps for each course as follows:

(a) Cleanse the data in each A1C1, A2C1, A3C1 and A4C1 to ensure that there are no duplicate sub-buckets (meaning Unique slides). Duplicates are identified using Granularity L2 matches at the header level for each L4. The buckets are also enriched with the order of the narration, based on the defined entity/functional library available.

(b) Likewise, parse the other categories "C2-5" and cleanse the data for duplicates, incorrect lexicons etc.

(c) Associate each entity in the JSON with the unique course-id to ring-fence each course with the content.

(d) The algorithm then converts the JSON to the associated course-ware in the system.

A second example is presented with reference to FIG. 6, where a second document 600 is represented that comprises a detailed user guide on the topic of direct procurement. For purposes of this example, the second document 600 is a multi-page document (e.g., multiple slides in a slideshow or PDF, etc.) with image content, text, sentences, diagrams, etc. The content processing and extraction engine can receive the second document 600 and automatically extract one or more discrete portions of the content which can be classified into one of several topic categories. In this case, a first content portion 610 is classified under "supplier portal", a second content portion 620 is classified under "direct procurement process", a third content portion 630 is classified under "purchase requisition", and a fourth content portion is classified under "direct procurement category". FIG. 6 schematically depicts the different types of content in each content portions, including charts, text, images, and flow diagrams. These categorized content portions are further classified into one of the four buckets (e.g., bucket classifications 650, including words (L1), sentences (L2), images (L3), and Pages (L4)). In some embodiments, the content processing and extraction engine can then further parse the data into one of the courseware containers. As an example, the system can be configured to parse the data into one or more course buckets 660, including presentation bucket(s), presentation speech bucket(s), guided navigation object(s), guided navigation speech bucket(s), and intents and responses. It should be appreciated that each word in words (L1) can be assigned to one courseware container (e.g., a presentation bucket) or can be assigned to multiple courseware containers (two or more), or even all five of the containers. This is also true for the other levels, where each sentence in the sentences (L2), each image in the images (L3), and each page in the pages (L4) can fall into one or more of the courseware containers. In addition, the same information can be classified into two (or more) different buckets, and two (or more) different courseware containers.

Figure 7A:
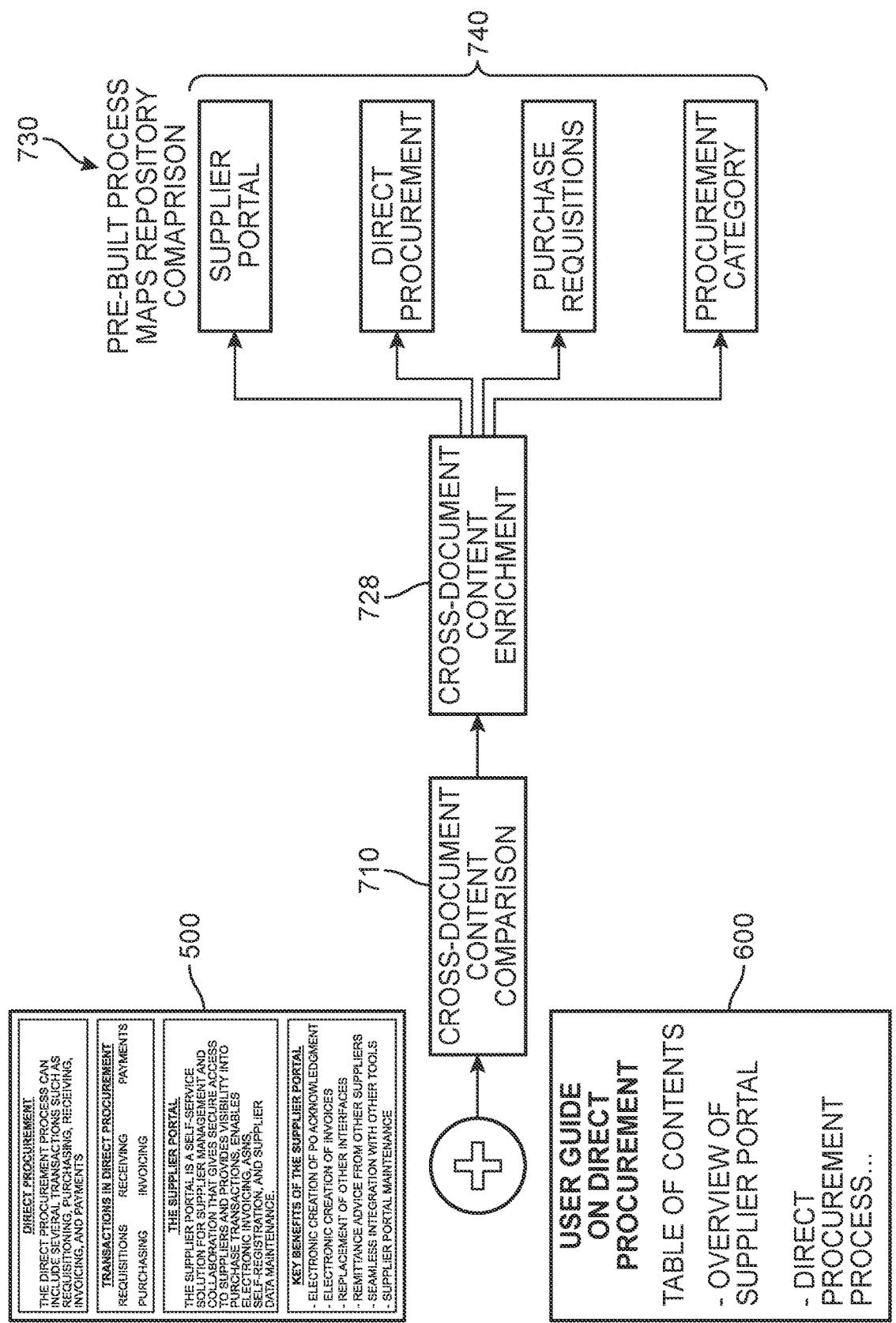
FIGS. 7A and 7B show a diagram depicting an example of the training document of FIG. 6 as it is processed by a learning module creation engine, according to an embodiment.
Figure 7B:
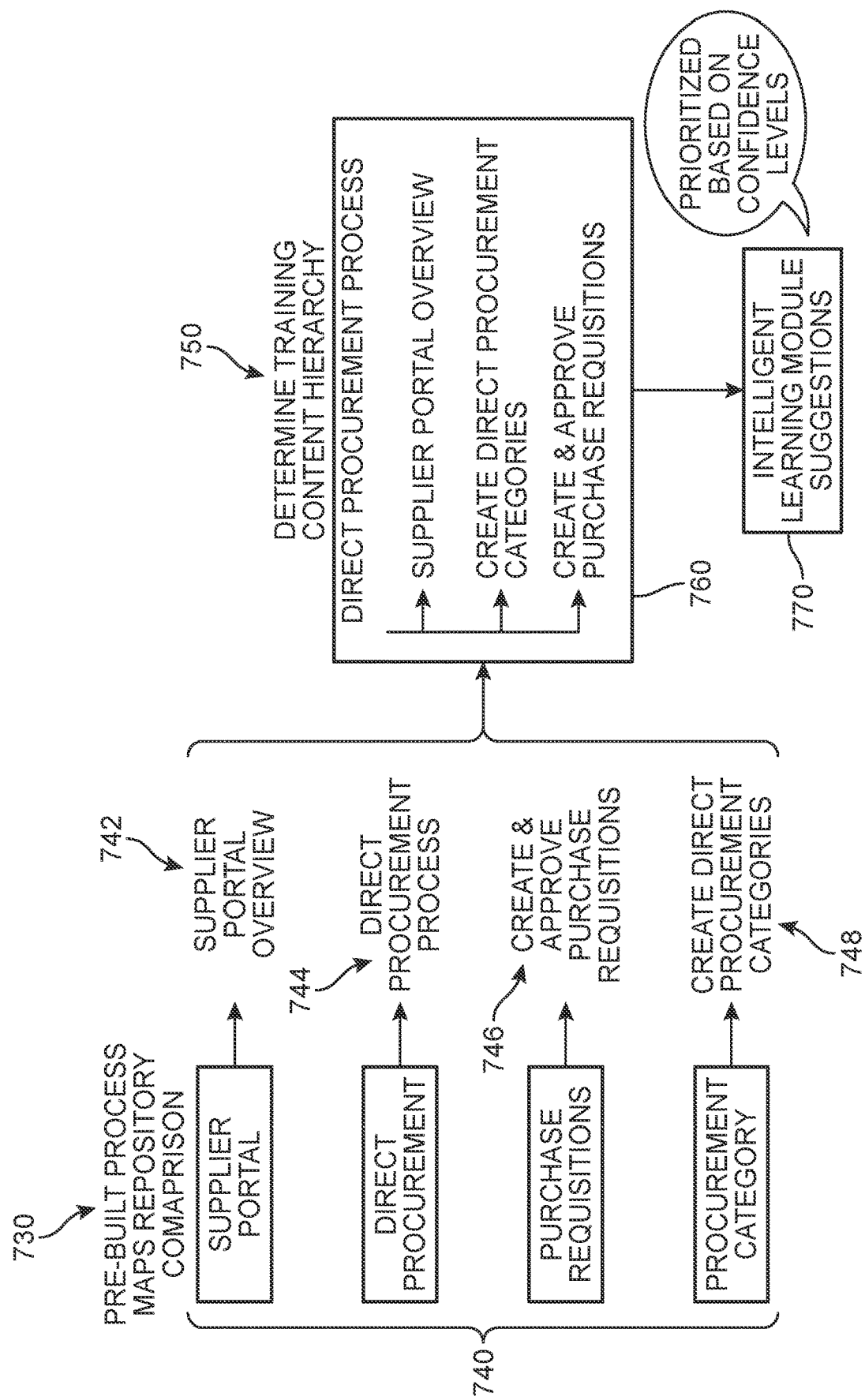

Moving now to FIGS. 7A and 7B, an example implementation of the learning module creation engine is depicted. In FIG. 7A, the first document 500 and the second document 600 are shown now as one group of contents or legacy training documents that are submitted to the system. The content of the one document is compared to the content of another document in a first step 710, and the content of one is used to enrich the content of the other in a second step 720. The resulting data is then mapped in a third step 730 using a pre-built process to each of the topic repositories 740 (e.g., supplier portal, direct procurement, purchase requisitions, procurement category).

In FIG. 7B, the data that is harvested and assigned to each of the topic repositories 740 can be used as the basis for creating different courseware. In this example, the supplier portal repository is used to generate a supplier portal overview knowledge 742, the direct procurement repository is used to generate direct procurement process knowledge 744, the purchase requisitions repository is used to generate a creation and approval of purchase requisitions knowledge 746, and the procurement category repository is used to generate a creation of direct procurement categories knowledge 748. This data is then parsed through a training content hierarchy determination module 750, which rearranges the information in a system-determined ordering or sequence that presents the right or appropriate piece of information in the correct order. In this example, the direct procurement process knowledge is understood to encapsulate the information as a whole, and the ordering or sequence of presentation starts with the supplier portal overview, followed by the creation of direct procurement categories, and then the creation and approval of purchase requisitions. Thus, the training content hierarchy determination module 750 can ensure that training material is offered to a user in the most logical order, such that more advanced or detailed steps are discussed in the appropriate, larger context.

Figure 8:
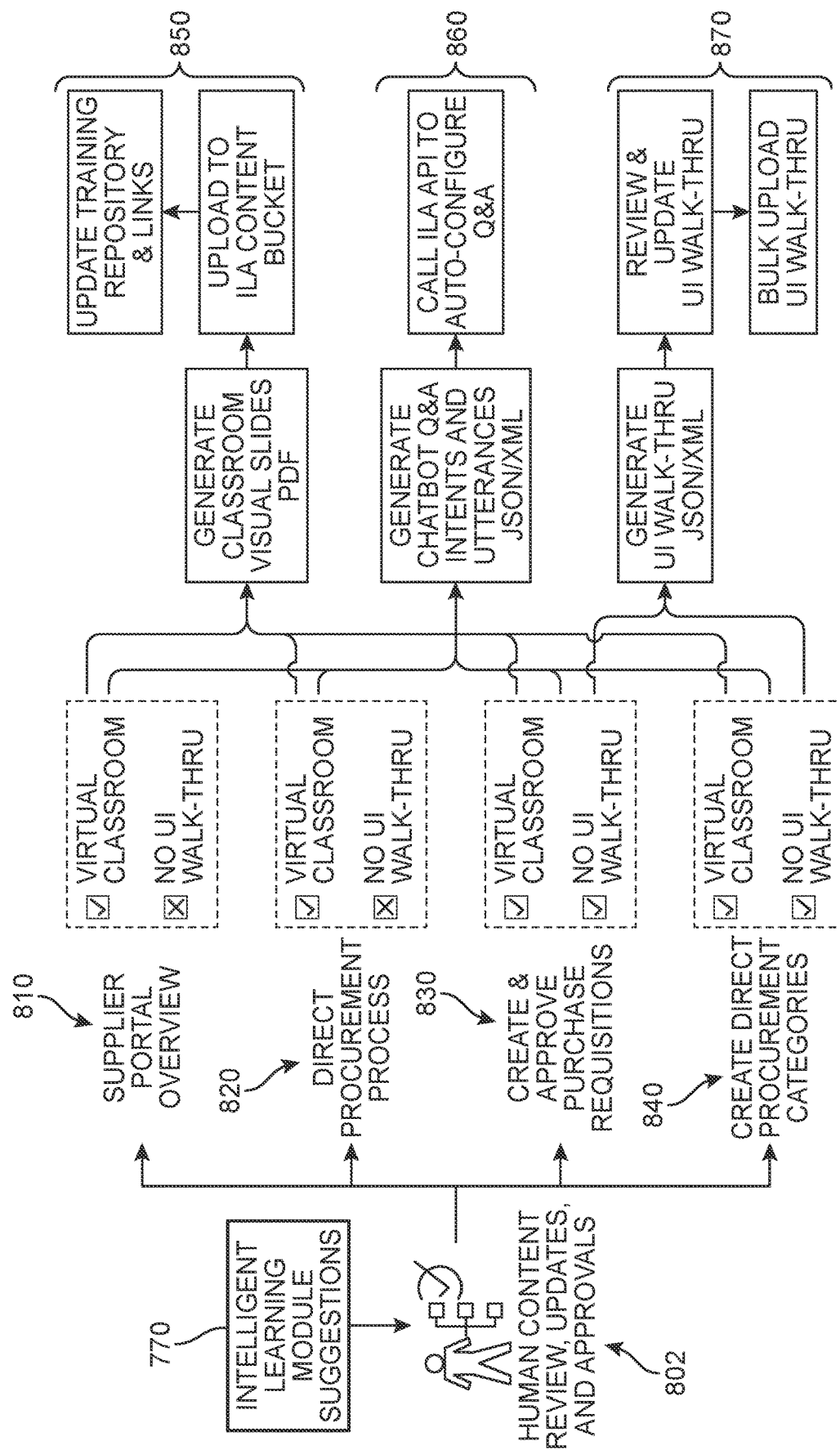
FIG. 8 is a flow diagram depicting an example of automated courseware creation, according to an embodiment.

Finally, this sequence of knowledge—also referred to as intelligent learning module suggestions—is used to automatically create appropriate courseware modules, with the information prioritized based on confidence levels. As shown in FIG. 8, for each of the topics, a separate courseware can be automatically developed, in conjunction with or outside of human-based reviewed content 802. In a first example 810, knowledge related to the supplier process overview is harvested and used to generate a virtual classroom module; however, there is insufficient materials to generate a UI walkthrough for the supplier process overview. In different embodiments, a virtual classroom module 850 can include visual slides (e.g., PDF or slideshow media) that can be uploaded to the appropriate content bucket and added to the training repository.

In a second example 820, knowledge related to the direct procurement process is also harvested and used to generate a virtual classroom module; however, there is insufficient materials to generate a UI walkthrough for the direct procurement. In a third example 830, knowledge related to creation and approval of purchase requisitions is harvested and is sufficient to generate both a virtual classroom module, and a UI walkthrough. In different embodiments, a UI walkthrough 870 can include generation of the walkthrough, reviewing and updating the walkthrough, and bulk upload of the walkthrough to the cloud. Finally, in a fourth example 840, knowledge related to the creation of direct procurement categories is also harvested and is sufficient to generate both a virtual classroom module, and a UI walkthrough. In some embodiments, an interactive, intelligent avatar can also be implemented that can exchange information based on the classified data for all of the buckets which is used to develop Q&A intents and utterances, and the pertinent API is called to auto-configure the Q&A.

Figure 9:
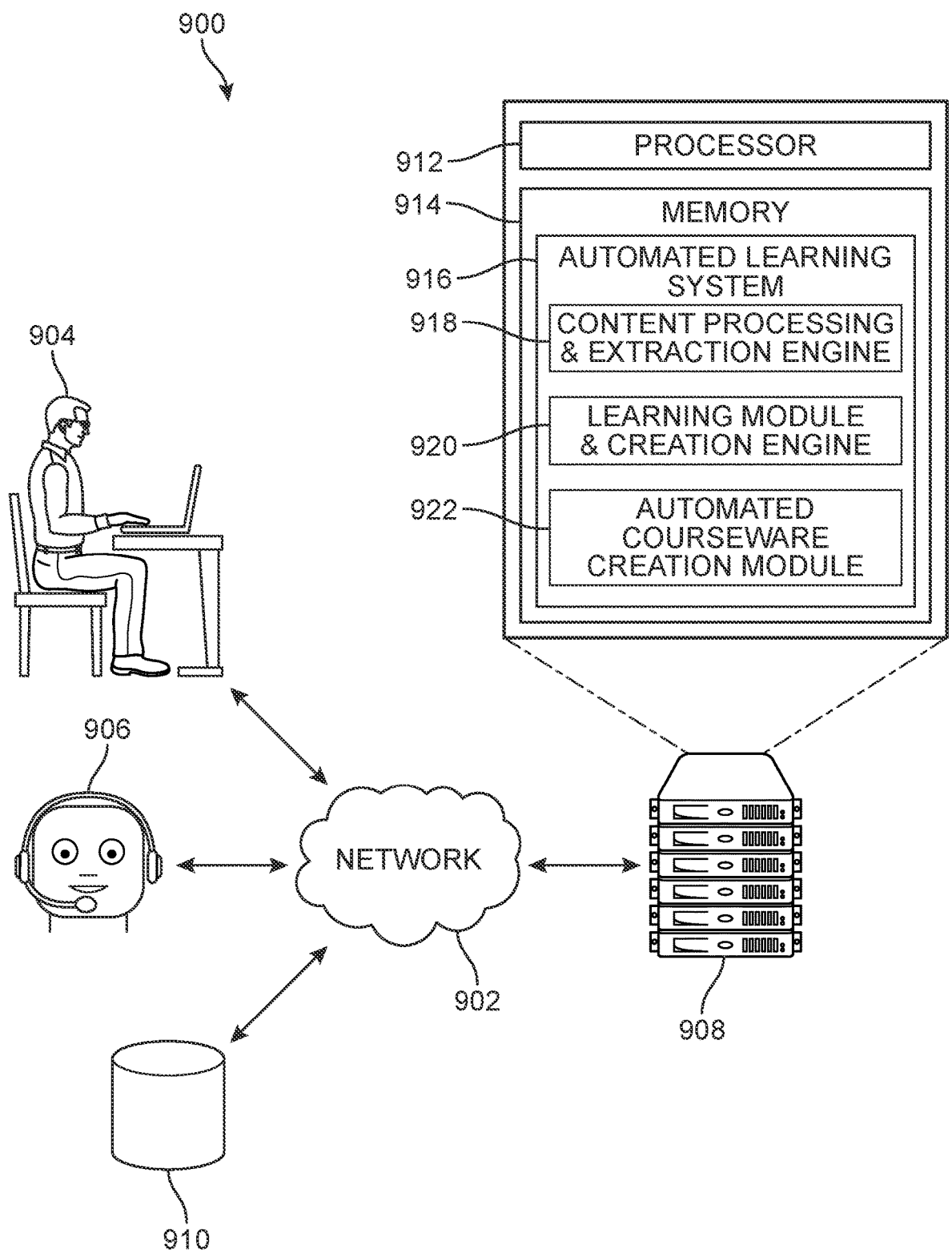
FIG. 9 is a diagram depicting example environments and components by which systems and/or methods, described herein, may be implemented, according to an embodiment.

For purposes of reference, FIG. 9 presents a schematic diagram of an intelligent automated learning content (ILC) creation system 900 (or system 900), according to an embodiment. The disclosed system may include a plurality of components capable of performing the disclosed computer implemented method of harvesting data and converting legacy documents to produce courseware (e.g., see method 1000 below). For example, system 900 includes a first user device 904, a virtual agent (or interactive avatar) 906, a computing system 908, a network 902, and a database 910. The components of system 900 can communicate with each other through network 902. For example, first user device 904 may communicate with virtual agent 906 via network 902. In some embodiments, network 902 may be a wide area network ("WAN"), e.g., the Internet. In other embodiments, network 902 may be a local area network ("LAN").

As shown in FIG. 9, a content processing and extraction engine 918, a learning module and courseware creation engine 920, and an automated courseware creation module 922 may be hosted in computing system 908, which may have a memory 914 and a processor 912. Processor 912 may include a single device processor located on a single device, or it may include multiple device processors located on one or more physical devices. Memory 914 may include any type of storage, which may be physically located on one physical device, or on multiple physical devices. In some cases, computing system 908 may comprise one or more servers that are used to host intelligent learning module and courseware creation engine 916. Database 910 may store data that may be retrieved by other components for system 900.

While FIG. 9 shows a single user device, it is understood that more user devices may be used. For example, in some embodiments, the system may include two or three user devices. The user may include an individual seeking guidance on how to perform a particular task or understand a specific concept. In some embodiments, the user device may be a computing device used by a user. For example, first user device 904 may include a smartphone or a tablet computer. In other examples, first user device 904 may include a laptop computer, a desktop computer, and/or another type of computing device. The user devices may be used for inputting, processing, and displaying information. Virtual agent 906 may be a chatbot capable of communicating with first user device 904. For example, virtual agent 906 may conduct a chat with first user device 904 in which virtual agent 906 offers to walk the user through a particular sequence of steps via the user interface.

Figure 10:
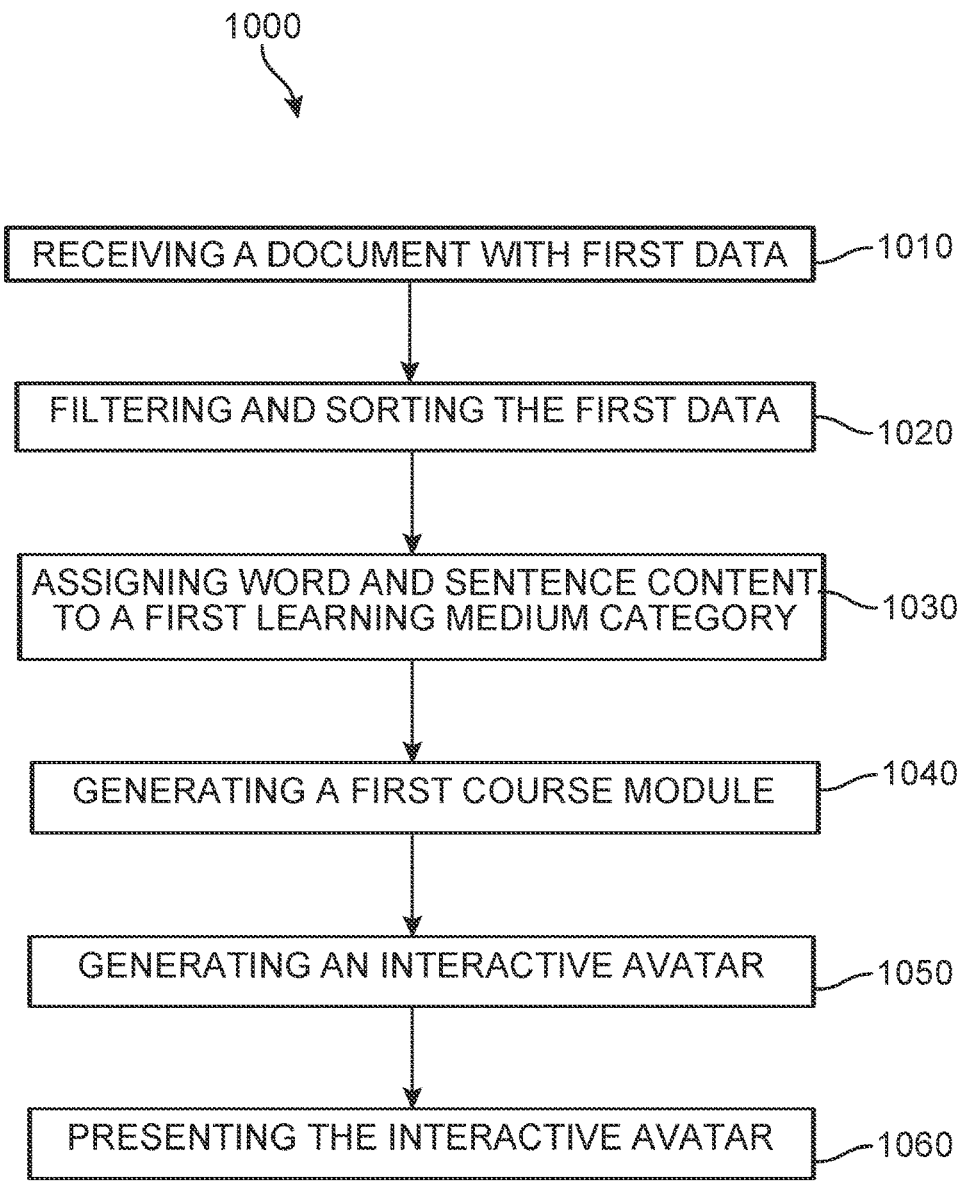
FIG. 10 is a flow chart depicting a method for automatically generating an interactive avatar for training human end-users, according to an embodiment.

FIG. 10 shows an overview of the disclosed method of automatically generating an interactive avatar for training human end-users by converting legacy documents to produce courseware 1000 (or method 1000), according to an embodiment. The method 1000 includes a first step 1010 of receiving (at a content processing and extraction engine) a first document including first data, and a second step 1020 of filtering and sorting the first data based on four levels of granularity, including words, sentences, images, and pages, thereby producing granularized data including word data, sentence data, image data, and pages data. The method 1000 also includes a third step 1030 of assigning, via a learning module creation engine, content in the granularized data that includes only the word data and sentence data to a first learning medium category, and a fourth step 1040 of automatically generating, via the learning module creation engine, a first course module based on the content assigned to the first learning medium category. A fifth step 1050 includes generating, via a courseware creation engine, a first interactive avatar user training experience based on the first course module, and a sixth step 1060 includes presenting, at a computing device, the first interactive avatar user training experience.

In other embodiments, the method may include additional steps or aspects. In one embodiment, the first learning medium category is one of four learning medium categories that include a presentation category, a presentation speech category, a guided navigation objects category, and an intents and responses category. In some embodiments, the method also includes steps of assigning content that includes only the image data and pages data to a second learning medium category of the four learning medium categories, and automatically generating a second course module based on the content assigned to the second learning medium category, the second learning medium category differing from the first learning medium category.

In another example, the method can include steps of extracting a first content portion from the first document, and classifying the first content portion as including one or more of structured, semi-structured, un-structured, and speech data. In some embodiments, the method further includes converting the first data to a first hierarchical format to produce a first hierarchical data, passing the first hierarchical data to the learning module creation engine, recognizing a plurality of keywords in the first hierarchical data, identifying, from the plurality of keywords, a keyword hierarchy, creating, based on the keyword hierarchy, a training content hierarchy that includes a first topic bucket, and sorting at least some of the granularized data to the first topic bucket based on context association. In one embodiment, the first interactive avatar user training experience includes a question-and-answer chatbot modality. In another example, the method can also include generating a second interactive avatar user training experience based on the first course module that includes a visually presented slideshow.

Generally, at a high level, the disclosed method may include receiving input (legacy) documents and/or other source data related to the software. These input documents may provide details characterizing the purpose of a specific task, the steps involved in performing the task, and/or the types of inputs and/or information needed to successfully complete the task. The system and method may further include processing the input documents and extracting relevant details. The extracted content can be stored in a common format. Furthermore, the system and method can also include creation of learning modules, for example based on the converted data and pre-seeded process maps and pre-built keyword maps. In addition, the system and method can include the automated generation and presentation of courseware.

The use of an intelligent avatar to assist clients during business process is described. The system includes a content processing and extraction engine is used to generate bucket classifications, including presentation buckets, presentation speech buckets, guided nav objects, guided nav speech buckets, and intents and responses. The buckets will be used to form a learning module creation engine, which produces intelligent learning module suggestions prioritized based on confidence levels. Finally, an automated courseware creation occurs in which virtual classrooms and user interface walkthroughs customized for the user's specific business process flow is provided.

The number and arrangement of components shown in the figures are provided as an example. In practice, the system may include additional components, fewer components, different components, or differently arranged components than those shown in the drawings. Additionally, or alternatively, a set of components (e.g., one or more components) of the system may perform one or more functions described as being performed by another set of components of the system.

Throughout this application, a virtual assistant may also be referred to as a virtual assistant system, a digital assistant, a digital assistant system, a digital personal assistant, an automated chatbot ("chatbot") and/or an automated agent. As a general matter, such terms should be understood to encompass a processing environment that is adapted to utilize spoken cues from utterances spoken in session to influence a render state for an interface serving as an activity session assistant. Thus, some or all of the processing environment may be referred to as, included in, and/or include the virtual assistant. Furthermore, a virtual assistant and associated systems for communicating with a virtual assistant may include one or more user devices, such as a computer, a server, a database, and a network. For example, a virtual assistant running on a server could communicate with a user over a network.

In different embodiments, the VA may be accessed via a user interface for the VA system. Throughout this application, an "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application. Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video associated with a teaching user interface, or other such information presentation.

Embodiments may include a non-transitory computer-readable medium (CRM) storing software comprising instructions executable by one or more computers which, upon such execution, cause the one or more computers to perform the disclosed methods. Non-transitory CRM may refer to a CRM that stores data for short periods or in the presence of power such as a memory device or Random Access Memory (RAM). For example, a non-transitory computer-readable medium may include storage components, such as, a hard disk (e.g., a magnetic disk, an optical disk, a magneto-optic disk, and/or a solid-state disk), a compact disc (CD), a digital versatile disc (DVD), a floppy disk, a cartridge, and/or a magnetic tape.

To provide further context, in some embodiments, some of the processes described herein can be understood to operate in a system architecture that can include a plurality of virtual local area network (VLAN) workstations at different locations that communicate with a main data center with dedicated virtual servers such as a web server for user interfaces, an app server for OCR and data processing, a database for data storage, etc. As a general matter, a virtual server is a type of virtual machine (VM) that is executed on a hardware component (e.g., server). In some examples, multiple VMs can be deployed on one or more servers.

In different embodiments, the system may be hosted at least in part in a cloud computing environment offering ready scalability and security. The cloud computing environment can include, for example, an environment that hosts the document processing management service. The cloud computing environment may provide computation, software, data access, storage, etc. services that do not require end-user knowledge of a physical location and configuration of system(s) and/or device(s) that hosts the policy management service. For example, a cloud computing environment may include a group of computing resources (referred to collectively as "computing resources" and individually as "computing resource"). It is contemplated that implementations of the present disclosure can be realized with appropriate cloud providers (e.g., AWS provided by Amazon™, GCP provided by Google™, Azure provided by Microsoft™, etc.).

The methods, devices, and processing described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of automatically generating an interactive avatar for training human end-users in a distributed system using multiple servers over a network, the method comprising:
    receiving, by at least one processor, a first document including first data via the network, wherein the at least one processor includes circuitry to facilitate operations of the multiple servers over the network;
    identifying, by the at least one processor, structured electronic content, unstructured electronic content, and speech content from the first data;
    generating, by the at least one processor, a first version of the first document in a common hierarchical machine readable format by executing a rule-based extraction process on the structured electronic content;
    generating, by the at least one processor, a second version of the first document in the common hierarchical machine readable format by executing a machine learning model-based extraction process on the unstructured electronic content;
    generating, by the at least one processor, a third version of the first document in the common hierarchical machine readable format by executing a natural language processing technique on the speech content;
    generating, by the at least one processor, first hierarchical data from the common hierarchical machine readable format, based on the generated first version of the first document, the second version of the first document, and the third version of the first document;
    filtering and sorting, by the at least one processor, the first data based on the first hierarchical data and four levels of granularity, including words, sentences, images, and pages, thereby producing granularized data including word data, sentence data, image data, and pages data;
    assigning, by the at least one processor, content in the granularized data that includes only the word data and the sentence data to a first learning medium category;
    automatically generating, by the at least one processor, a first course module based on the content assigned to the first learning medium category, wherein the first course module is generated by executing intra and multi-sentence parsing on the content in the granularized data to determine gestures, vocabulary, and speech emotions of the interactive avatar;
    generating, by the at least one processor, a first interactive avatar user training experience based on the first course module; and
    presenting, by the at least one processor and at a computing device, the first interactive avatar user training experience including interaction between the interactive avatar and at least one user of the human end-users.

2. The method of claim 1, wherein the first learning medium category is one of four learning medium categories that include a presentation category, a presentation speech category, a guided navigation objects category, and an intents and responses category.

3. The method of claim 2, further comprising:
    assigning content that includes only the image data and the pages data to a second learning medium category of the four learning medium categories; and
    automatically generating a second course module based on the content assigned to the second learning medium category, the second learning medium category differing from the first learning medium category.

4. The method of claim 3, further comprising generating a second interactive avatar user training experience based on the first course module that includes a visually presented slideshow.

5. The method of claim 1, further comprising:
    recognizing a plurality of keywords in the first hierarchical data;
    identifying, from the plurality of keywords, a keyword hierarchy;

creating, based on the keyword hierarchy, a training content hierarchy that includes a first topic bucket; and sorting at least some of the granularized data to the first topic bucket based on context association.

6. The method of claim 1, wherein the first interactive avatar user training experience includes a question-and-answer chatbot modality.

7. A non-transitory computer-readable medium storing software comprising instructions executable by one or more computers which, upon such execution, cause the one or more computers to:

receive, by at least one processor, a first document including first data via a network, wherein the at least one processor includes circuitry to facilitate operations of multiple servers over the network;

identify, by the at least one processor, structured electronic content, unstructured electronic content, and speech content from the first data;

generate, by the at least one processor, a first version of the first document in a common hierarchical machine readable format by executing a rule-based extraction process on the structured electronic content;

generate, by the at least one processor, a second version of the first document in the common hierarchical machine readable format by executing a machine learning model-based extraction process the unstructured electronic content;

generate, by the at least one processor, a third version of the first document in the common hierarchical machine readable format by executing a natural language processing technique on the speech content;

generate, by the at least one processor, first hierarchical data from the common hierarchical machine readable format, based on the generated first version of the first document, the second version of the first document, and the third version of the first document;

filter and sort, by the at least one processor, the first data based on the first hierarchical data and four levels of granularity, including words, sentences, images, and pages, thereby producing granularized data including word data, sentence data, image data, and pages data;

assign, by the at least one processor, content in the granularized data that includes only the word data and the sentence data to a first learning medium category;

automatically generate, by the at least one processor, a first course module based on the content assigned to the first learning medium category, wherein the first course module is generated by executing intra and multi-sentence parsing on the content in the granularized data to determine gestures, vocabulary, and speech emotions of the interactive avatar;

generate, by the at least one processor, a first interactive avatar user training experience based on the first course module; and present, by the at least one processor and at a computing device, the first interactive avatar user training experience including interaction between the interactive avatar and at least one user of the human end-users.

8. The non-transitory computer-readable medium storing software of claim 7, wherein the first learning medium category is one of four learning medium categories that include a presentation category, a presentation speech category, a guided navigation objects category, and an intents and responses category.

9. The non-transitory computer-readable medium storing software of claim 7, wherein the instructions further cause the one or more computers to:

assign content including only the image data and the pages data to a second learning medium category of the four learning medium categories; and automatically generate a second course module based on the content assigned to the second learning medium category, the second learning medium category differing from the first learning medium category.

10. The non-transitory computer-readable medium storing software of claim 9, wherein the instructions further cause the one or more computers to generate a second interactive avatar user training experience based on the first course module that includes a visually presented slideshow.

11. The non-transitory computer-readable medium storing software of claim 7, wherein the instructions further cause the one or more computers to:

recognize a plurality of keywords in the first hierarchical data;

identify, from the plurality of keywords, a keyword hierarchy;

create, based on the keyword hierarchy, a training content hierarchy that includes a first topic bucket; and sort at least some of the granularized data to the first topic bucket based on context association.

12. The non-transitory computer-readable medium storing software of claim 7, wherein the first interactive avatar user training experience includes a question-and-answer chatbot modality.

13. A system for automatically generating an interactive avatar for training human end-users, the system comprising one or more computers and one or more storage devices storing instructions that are operable, when executed by the one or more computers, to cause the one or more computers to:

receive, by at least one processor, a first document including first data via the network, wherein the at least one processor includes circuitry to facilitate operations of the multiple servers over the network;

identify, by the at least one processor, structured electronic content, unstructured electronic content, and speech content from the first data;

generate, by the at least one processor, a first version of the first document in a common hierarchical machine readable format by executing a rule-based extraction process on the structured electronic content;

generate, by the at least one processor, a second version of the first document in the common hierarchical machine readable format by executing a machine learning model-based extraction process on the unstructured electronic content;

generate, by the at least one processor, a third version of the first document in the common hierarchical machine readable format by executing a natural language processing technique on the speech content;

generate, by the at least one processor, first hierarchical data from the common hierarchical machine readable format, based on the generated first version of the first document, the second version of the first document, and the third version of the first document;

filter and sort, by the at least one processor, the first data based on the first hierarchical data and four levels of granularity, including words, sentences, images, and pages, thereby producing granularized data including word data, sentence data, image data, and pages data;

assign, by the at least one processor, content in the granularized data that includes only the word data and the sentence data to a first learning medium category;

automatically generate, by at least one processor, a first course module based on the content assigned to the first learning medium category, wherein the first course module is generated by executing intra and multi-sentence parsing on the content in the granularized data to determine gestures, vocabulary, and speech emotions of the interactive avatar;

generate, by the at least one processor, a first interactive avatar user training experience based on the first course module; and present, by the at least one processor and at a computing device, the first interactive avatar user training experience including interaction between the interactive avatar and at least one user of the human end-users.

14. The system of claim 13, wherein the first learning medium category is one of four learning medium categories that include a presentation category, a presentation speech category, a guided navigation objects category, and an intents and responses category.

15. The system of claim 13, wherein the instructions further cause the one or more computers to:
assign content including only the image data and the pages data to a second learning medium category of the four learning medium categories; and
automatically generate a second course module based on the content assigned to the second learning medium category, the second learning medium category differing from the first learning medium category.

16. The system of claim 13, wherein the instructions further cause the one or more computers to:
recognize a plurality of keywords in the first hierarchical data;
identify, from the plurality of keywords, a keyword hierarchy;
create, based on the keyword hierarchy, a training content hierarchy that includes a first topic bucket; and
sort at least some of the granularized data to the first topic bucket based on context association.

17. The system of claim 13, wherein the first interactive avatar user training experience includes a question-and-answer chatbot modality.

* * * * *